United States Patent Office 3,657,250
Patented Apr. 18, 1972

3,657,250
BENZOCYCLOHEPTAISOQUINOLINE DERIVATIVES
Francois T. Bruderlein, Montreal, Quebec, and Leslie G. Humber, Dollard des Ormeaux, Quebec, Canada, assignors to Ayerst, McKenna and Harrison Limited, Ville St. Laurent, Quebec, Canada
No Drawing. Filed Feb. 10, 1970, Ser. No. 10,306
Int. Cl. C07d 39/00
U.S. Cl. 260—286 Q
3 Claims

ABSTRACT OF THE DISCLOSURE

Octahydrobenzo[6,7]cyclohepta[1,2,3-d,e]pyrido- (or pyrrolo) [2,1-a]isoquinolines, optionally substituted on the piperidine or pyrrolidine ring with lower alkyl. The compounds are useful CNS depressants, anticonvulsant and antiinflammatory agents, and methods for their preparation and use are also disclosed.

BACKGROUND OF THE INVENTION

The present invention relates to benzocycloheptaisoquinoline derivatives, to intermediate used in their preparation, and to processes for preparing these compounds.

The benzocycloheptaisoquinoline derivatives of this invention possess valuable pharmacologic properties. For example, the compounds exhibit useful central nervous system depressant, anticonvulsant and antiinflammatory properties. Especially noteworthy are the central nervous system depressant properties of the compounds. More specifically, the benzocycloheptaisoquinoline derivatives of this invention have a more favourable separation of useful central nervous system depressant effects from ataxic properties and undesirable autonomic nervous system effects that are possessed by most other such depressants. In addition, the benzocycloheptaisoquinoline derivatives possess a low order of toxicity.

The combination of attributes stated above renders the benzocycloheptaisoquinolines of this invention useful and desirable as therapeutic agents.

SUMMARY OF THE INVENTION

The benzocycloheptaisoquinoline derivatives of this invention may be represented by Formula I,

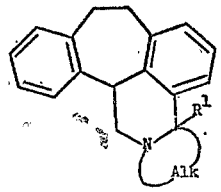

(I)

in which $R^1$ represents a hydrogen or a lower alkyl and Alk represents

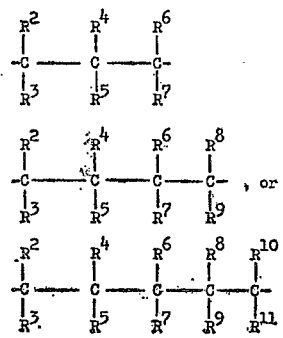

in which $R^2$, $R^3$, $R^4$, $R^5$, $R^6$, $R^7$, $R^8$, $R^9$, $R^{10}$ and $R^{11}$ are the same or different selected from the group consisting of hydrogen and lower alkyl.

DETAILS OF THE INVENTION

The benzocycloheptaisoquinoline derivatives of Formula I are capable of forming acid addition salts with pharmaceutically acceptable acids. Such acid addition salts are included within the scope of this invention.

The acid addition salts are prepared by reacting the base form of the benzocycloheptaisoquinoline derivative with either one equivalent or preferably an excess of the appropriate acid in an organic solvent, such as ether or an ethanol-ether mixture. These salts, when administered to mammals, possess the same pharmacologic activities as the corresponding bases. For many purposes it is preferable to administer the salts rather than the base compounds. Among the acid addition salts suitable for this purpose are salts such as the sulfate, phosphate, lactate, tartrate, maleate, citrate and hydrochloride. Both the base compounds and the above acid addition salts have the distinct advantage of possessing a relatively low order of toxicity.

Also included in this invention are the two stereochemical isomers of the compounds of Formula I which result from the different configurations in which the two rings, having the nitrogen atom in common, may exist along the C–N axis. These two isomeric forms may be prepared by different methods and are purified readily by crystallization or chromatography.

Individual optical isomers, which might be separated by fractional crystallization of the diastereoisomeric salts formed thereof, for instance, with d- or l-tartaric acid or D-(+)-α-bromocamphor sulfonic acid, are also included.

The useful central nervous system depressant activity and the anticonvulsant activity of the benzocycloheptaisoquinoline derivatives of Formula I and their acid addition salts with pharmaceutically acceptable acids may be demonstrated in standard pharmacologic tests, such as, for example, the tests described by R. A. Turner in "Screening Methods in Pharmacology," Academic Press, New York and London, 1965, pp. 69–99 and 164–172, respectively.

When the benzocycloheptaisoquinoline derivatives of this invention are used as central nervous system depressants or anticonvulsant agents in warm-blooded mammals, e.g. rats and mice, they may be used alone or in combination with pharmacologically acceptable carriers, the proportion of which is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 1.0 mg. to about 500 mg. per kilo per day, although as aforementioned variations will occur. However, a dosage level that is in the range of from about 10 mg. to about 100 mg. per kilo per day is most desirably employed in order to achieve effective results.

The benzocycloheptaisoquinoline derivatives of this invention possess another useful pharmacologic property; that is, they are useful as anti-inflammatory agents. More particularly, the said compounds of this invention exhibit anti-inflammatory activity in standard pharmacologic tests, for example, the tests similar to those described by Robert A. Turner in "Screening Methods in Pharmacology," Academic Press, pp. 152–163, 1965, based on the reduction of pedal inflammation.

When the benzocycloheptaisoquinoline derivatives of this invention are employed as anti-inflammatory agents in warm-blooded animals, e.g., rats, they may be administered orally, alone or in tablets combined with pharmacologically acceptable excipients, such as starch, milk sugar and so forth. They may also be administered orally in the form of solutions in suitable vehicles such as vegetable oils.

The dosage of the benzocycloheptaisoquinoline derivatives of this invention will vary with the particular compound chosen and form of administration. Furthermore, it will vary with the particular host under treatment. Generally, the compounds of this invention are administered at a concentration level that affords protective effects without any deleterious side effects. These effective concentration levels are usually obtained within a therapeutic range of 10 mg. to 100 mg. per kilo per day, with a preferred range of 25 mg. to 50 mg. per kilo per day.

For the preparation of the benzocycloheptaisoquinolines of Formula I, we have found it convenient to use the process illustrated by FIG. 1 in which $R^1$ and Alk are as defined above, Y represents the hydroxyl group or chlorine, bromine or iodine and X represents the nucleophilic residue derived from a condensing agent used in the Bischler-Napieralski reaction such as a bromine or chlorine or a phosphate.

FIGURE 1

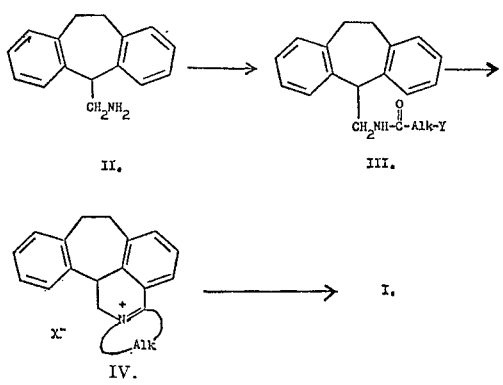

In practising the above process, 10,11-dihydro-5H-dibenzo[a,d]cycloheptene-5-methylamine (II), described by L. G. Humber et al., J. Heterocyclic Chem., 3, 247 (1966), is condensed with an appropriate lactone of general formula

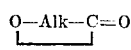

in which Alk is as defined above to yield the corresponding hydroxyamide of Formula III in which Y is the hydroxyl group. The appropriate lactones utilized in this condensation are either available commercially, for example, butyrolactone, δ-valerolactone, or α - methyl - γ-butyrolactone, or they are described with a variety of methods for their preparation in organic chemistry textbooks; such as the textbook, "Methoden der Organischen Chemie," Houben-Weyl, E. Muller, ed., vol. VI/2, Georg Thieme Verlag, Stuttgart, 1963, pp. 561–852.

Convenient conditions for this condensation include heating the dibenzocycloheptenemethylamine of Formula II and the appropriate lactone together at a temperature from 100 to 180° C. for a period ranging from two to 24 hours.

Although the condensation may be accomplished without the use of solvent, the use of an inert solvent, such as an aromatic hydrocarbon, for example, benzene, or a lower alkanol, for example ethanol, is preferred. When this condensation is performed is a solvent, then it is preferable to conduct the reaction at the boiling point of the reaction mixture for a period of seven to 24 hours.

The corresponding hydroxyamide of Formula III in which Y is the hydroxyl group, thus obtained, is subjected to the conditions of the Bischler-Napieralski reaction, see for example, W. M. Whaley and T. R. Govindachari in Organic Reactions, 6, 74 (1951). Subsequent heating of the crude product from this reaction in an inert solvent, preferably benzene, promotes the completion of the conversion to the quaternary salt of Formula IV in which Alk and X are defined as above. Preferred reaction conditions for the Bischler-Napieralski reaction in this case include the use of phosphorus oxychloride as the condensing agent, temperatures ranging from 50 to 150° C., or reaction time of one to four hours and the use of toluene or benzene as solvent.

Reduction of the quaternary salt of Formula IV, obtained as described above, with either an alkali metal borohydride, in inert solvents such as, for instance, methanol or water, or by means of catalytically activated hydrogen, using preferably Raney nickel or palladium or platinum catalyst, in solvent such as, for example, ethanol, acetic acid or tetrahydrofuran, affords one isomer of the compounds of Formula I in which Alk is as defined above and $R^1$ represents a hydrogen atom. For convenience, this isomer is designated as isomer B and is one of the configurational isomers, discussed above.

On the other hand reduction of the quaternary salts of Formula IV in the presence of a metal, for example, zinc, with an acid, for example, hydrochloric acid, using an appropriate solvent such as ethanol, affords another isomer of the compounds of Formula I in which Alk is as defined above and $R^1$ represents a hydrogen atom. For convenience, this isomer is designated as isomer A.

Furthermore, it is possible to convert either of the isomers A or B of Formula I, in which Alk is as defined above and $R^1$ represents a hydrogen atom, into the other. This interconversion is effected by oxidizing either of the above isomers A and B with mercuric acetate or lead tetraacetate, preferably the former, followed by treatment with an appropriate acid of formula HX in which X is as defined above, to regenerate the corresponding quaternary salt of Formula IV described above. Subsequent reduction of said quaternary salt, according to a method, described above, for affording the isomer different from the one originally oxidized, completes the interconversion.

We would add that the definition of X, and in turn the definition of the acid, HX, used in the above description of the interconversion of one isomer to the other, may be broadened to include any nucleophilic residue derived from an acid, for example, perchloric acid or lactic acid, capable of forming a quaternary salt of the class represented by Formula IV. Such quaternary salts, such as, for example, quaternary salts of Formula IV in which X represents a perchlorate or lactate, are then reduced in the aforementioned manner to give the desired other isomer.

In a variation of the process described above,

II→III→IV→I the starting material of Formula II is condensed with an appropriate ω-haloalkanoic acid halide of formula Z-Alk-COZ$^1$ in which Z and Z$^1$ are the same or different and each represent chlorine, bromine or iodine to yield the haloamide of Formula III in which Y is a chlorine, bromine or iodine. This condensation is achieved according to the same conditions employed above for the conversion of the starting material of Formula II to the hydroxyamide of Formula III in which Y is the hydroxy group except that an excess, preferably a three to five molar excess, of a neutralizing agent, for instance, sodium carbonate, is employed to combine with the acid formed as a by-product during the reaction.

The haloamide of Formula III thus obtained is then subjected to the conditions of the Bischler-Napieralski reaction, described above, to afford the quaternary salt of Formula IV which is reduced to compounds of Formula I in which R$^1$ is hydrogen and Alk is as defined above according to methods described above.

The appropriate ω-haloalkanoic acid halides used in the preceding process are prepared from their corresponding acids by treatment with thionyl chloride, thionyl bromide or phosphorus triiodide, the corresponding ω-haloalkanoic acids are either commercially available or are described with a variety of methods for their preparation in organic chemistry textbooks, for instance, see description by M. F. Ansell and R. H. Gigg in "Rodd's Chemistry of Carbon Compounds," vol. I, part C, S. Coffey, ed., 2nd ed., Elsevier Publishing Co., Amsterdam, 1965, pp. 201–214.

Alternatively, the above ω-haloalkanoic acid halides in which Z and Z$^1$ are the same may be readily prepared by treating the lactones of general formula

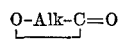

with thionyl chloride, thionyl bromide or phosphorus triiodide according to the methods such as described in "Methoden der Organischen Chemie," Houben-Weyl, E. Muller, ed., vol. VI/2, Georg Thieme Verlag, Stuttgart, 1963, pp. 561–852.

Finally, the practise of the present process and its variation (see FIG. 1, II→III→IV→I) includes the preparation of the benzocycloheptaisoquinolines of Formula I in which Alk is as defined above and R$^1$ represents a lower alkyl. The latter compounds are obtained by the action of a lower alkyl magnesium halide on the corresponding quaternary salt of Formula IV according to the conditions generally used for the Grignard reaction. For a description of these conditions, see L. Fieser and M. Fieser, "Advanced Organic Chemistry," Reinhold Publishing Corp., New York, 1961, p. 270. Preferred conditions for this reaction include a temperature range from room temperature to the boiling point of the mixture, a reaction time from 30 minutes to four hours and the use of ether or tetrahydrofuran as solvent.

Alternatively, the quaternary salt of Formula IV may be prepared by an entirely different process. In this case starting material is 10,11-dihydro-5H-dibenzo[a,d]cycloheptene-5-carboxaldehyde (V) which is readily obtained by the action of the Grignard reagent, prepared from chloromethyl methyl ether and magnesium, on 10,11-dihydro-5H-dibenzo[a,d]cyclohepten-5-one, described by S. O. Winthrop et al., J. Org. Chem., 27, 230 (1962). Reductive alkylation of 10,11-dihydro-5H-dibenzo[a,d] cycloheptene-5-carboxaldehyde with an appropriate aminoester of general formula NH$_2$—Alk-COOR$^{12}$ in which Alk is as defined above and R$^{12}$ is a lower alkyl, according to the methods described by A. R. Surrey and H. F. Hammer, J. Am. Chem. Soc., 66, 2127 (1944) or A. Skita and W. Stichmer, German Patent No. 716,668 (Chem. Abstr., 38, 2345 1944) for the preparation of derivatives of p-aminobenzoic acid, yields the cyclic amide VI. Treatment of the latter compound according to the conditions of the Bischler-Napieralski reaction, described above, affords the desired quaternary salt of Formula IV in which Alk and X are as described above.

The appropriate aminoesters used in the preceding process are prepared by the usual esterification procedures, of their corresponding free acids, see for example, L. Fieser and M. Fieser, cited above, pp. 370–380. The corresponding free acids are either available commercially, for example, 4-aminobutyric acid, 5-aminovaleric acid or 6-aminocaproic acid or are described with a variety of methods for their preparation in organic chemistry textbooks, such as the textbook, "Methoden der Organischem Chemie," Houben-Weyl, E. Muller, ed., vol. XI/2, Georg Thieme Verlag, Stuttgart, 1958, pp. 269–509.

Accordingly, the alternate preparation of the quaternary salt of Formula IV, in which Alk and X are as defined above, from another starting material constitutes an alternative process for the preparation of the benzocycloheptaisoquinolines of Formula I, which may be represented schematically by FIG. 2 in which R$^1$, Alk and X are as defined above.

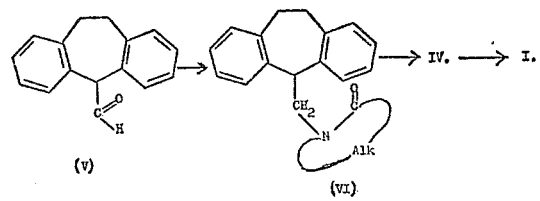

FIGURE 2

Finally this invention discloses a most convenient process for preparing the compounds of Formula I in which R$^1$ is hydrogen and Alk represents

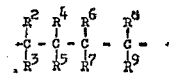

in which R$^2$, R$^4$, R$^6$ and R$^8$ are hydrogen or lower alkyl and R$^3$, R$^5$, R$^7$ and R$^9$ are hydrogen. This process is schematically represented by FIG. 3 in which R$^1$ and Alk are as defined immediately above and R$^{13}$, R$^{14}$ and R$^{15}$ are the same or different and each are selected from the group consisting of hydrogen and lower alkyl. The process is based in part on the synthesis of 1,3,4,6,6a,10,11,15b-octahydro - 5H - benzo[6,7]cyclohepta[1,2,3-d,e]pyrido [2,1-a]isoquinolin-5-one (VIII, R$^{13}$, R$^{14}$ and R$^{15}$=H) described previously by L. G. Humber et al., Can. J. Chem., 46, 2981 (1968) and by L. G. Humber and M. A. Davis, U.S. Pat. No. 3,361,751, issued Jan. 2, 1968.

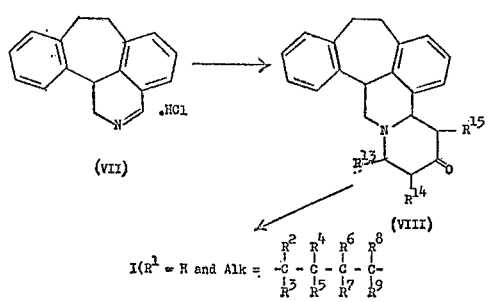

in which R², R⁴, R⁶ and R⁸ are hydrogen or lower alkyl and R³, R⁵, R⁷ and R⁹ are hydrogen).

FIGURE 3

In practising the process represented by FIG. 3, an acid addition salt, preferably the hydrochloric acid addition salt, of 1,7,8,12b-tetrahydrobenzo[1,2]cyclohepta[3,4,5-d,e]isoquinoline (VII), described by L. G. Humber et al., J. Heterocyclic Chem., 3, 247 (1966), is allowed to react with an unsaturated ketone of general formula

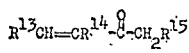

in which R¹³, R¹⁴ and R¹⁵ are as defined in the first instance, to yield the aminoketone of Formula VIII in which R¹³, R¹⁴ and R¹⁵ are as defined in the first instance. This extremely facile reaction may be performed in an inert solvent such as ethanol; however, when using the lower-molecular weight unsaturated ketones, such as methyl vinyl ketone or ethyl vinyl ketone, it is equally convenient to employ an excess of the unsaturated ketone as solvent for the reaction. Generally, this reaction is performed by heating the compounds together with or without an inert solvent for prolonged period of time. Preferred conditions for this reaction include heating the mixture on a steam bath from 30 minutes to four hours.

Most of the unsaturated ketones used in the preceding reaction are available commercially; the remainder are described or may be prepared by general methods cited in organic chemistry textbooks and publications, see for example, "Rodd's Chemistry of the Carbon Compounds," vol. I, part C, S. Coffey, ed., 2nd ed., Elsevier Publishing Co., Amsterdam, 1965, pp. 81–91 or D. Beke and C. Szantay, Chem. Ber., 95, 2132 (1962).

If desired, the aminoketone of Formula VIII may be separated into the A and B isomers by chromatography and purified by recrystallization.

The final conversion of this present process, the reduction of the aminoketone of Formula VIII to the compounds of Formula I, in which R¹ and Alk are as defined above for this process, may be accomplished in a variety of well known methods. For convenience, these methods are classified here into two catagories depending on whether or not a lower alkyl group is to be introduced at the carbonyl site of the aminoketone.

In the first category are classified those methods for reducing a carbonyl group to a methylene group including both one step reduction, such as the Clemmensen reduction or the Wolff-Kishner reduction, or reduction through a reducible intermediate such as, for instance, the corresponding derivative of the aminoketone of Formula VIII having a thioketal or tosyl group in place of the carbonyl group. Said derivative having the tosyl group is obtained by reduction of corresponding aminoketones of Formula VIII, preferably with sodium borohydride or lithium aluminum hydride, followed by tosylation of the resulting 5-alcohol. Said last-named 5-alcohol is obtained in two geometrically isomeric forms hereinafter called isomers A and B. For a general description of these methods refer to O. H. Wheeler in "The Chemistry of the Carbonyl Group," S. Patai, ed., Interscience Publishers, London, 1966, pp. 507–566. In practice we have found that an especially convenient manner for reducing the carbonyl group to the methylene group is to convert the aminoketone of Formula VIII to its corresponding thioketal derivative with ethanedithiol and an acid catalyst, for example, boron trifluoride etherate. The resulting thioketal derivative is then reduced with Raney nickel to the desired benzocycloheptaisoquinoline derivative of this invention.

In the second category are the methods for introducing an alkyl group at the site of the carbonyl group of the aminoketone of Formula VIII. Included among these methods is the preferred method whereby the aminoketone of Formula VIII is allowed to react with a lower alkyl magnesium halide according to the conditions of the Grignard reaction, cited above, followed by dehydration of the resulting tertiary carbinol with an acid catalyst, for example, p-toluenesulfonic acid, and then catalytic hydrogenation, using the conditions described above, to yield the desired benzocycloheptaisoquinoline of Formula I.

Alternatively, the alkyl group may be introduced at the site of the carbonyl group of the aminoketone of Formula VIII, by reacting the aminoketone with a lower alkylidenephosphorane according to the conditions of the Wittig reaction; see A. Maercker, Organic Reactions, 14, 270 (1965), followed by a similar catalytic reduction of the resulting alkylidene derivative.

In the above manner, the compounds of Formula I in which R¹ is hydrogen and Alk is as defined for this last process are obtained.

The following examples will illustrate further this invention.

EXAMPLE 1

10,11 - dihydro-5H-dibenzo[a,d]cycloheptene-5-methylamine (8.5) g.) and γ-butyrolactone (3.7 g.) are heated at 150° C. (internal temperature) for one hour. After cooling, the solid residue is recrystallized from benzene to give N-[(10,11-dihydro-5H-dibenzo[a,d]cyclohepten-5-yl) methyl] 4-hydroxybutyramide, (III, Alk=CH₂CH₂CH₂ and Y=OH), M.P. 103–105° C.

In the same manner, but using an equivalent amount of

α-methyl-, β-methyl- or γ-methyl-γ-butyrolactone,
α-ethyl-, β-ethyl- or γ-ethyl-γ-butyrolactone,
α-propyl-, β-propyl- or -propyl-γ-butyrolactone,
α,α-dimethyl-, β,β-dimethyl- or γ,γ-dimethyl-γ-butyrolactone,
α,α-diethyl-, β,β-diethyl- or γ,γ-diethyl-γ-butyrolactone,
α,α-dipropyl-, β,β-dipropyl- or γ,γ-dipropyl-γ,γ-butyrolactone,
α,α-dimethyl-,β,β-dimethyl- or γ,γ-dimethyl-γ-butyrolactone,
α-methyl-β-ethyl-, α-ethyl-β-propyl- or -propyl-γ-methyl-γ-butyrolactone,
α,β,γ-trimethyl-, α-mehtyl-β-ethyl-γ-propyl-,
α,α,β,γ-tetramethyl-, α,α-dimethyl-β-ethyl-γ-propyl,
α,α-γ-trimethyl-β,β-diethyl- or α,α,β,β,γ-pentamethyl-γ-propyl-γ-butyrolactone, or δ-valerolactone,
α-methyl-, β-methyl-, γ-methyl- or δ-methyl-δ-valerolactone,
α-ethyl-, β-ethyl-, γ-ethyl-, or δ-ethyl-δ-valerolactone,
α-propyl-, β-propyl-, γ-propyl- or δ-propyl-δ-valerolactone,
α,α-dimethyl-, β,β-dimethyl-, γ,γ-dimethyl- or δ,δ-dimethyl-δ-valerolactone,
α,α-diethyl-, β,β-diethyl-, γ,γ-diethyl- or δ,δ-diethyl-δ-valerolactone,
α,β-dimethyl-, α,γ-dimethyl-, α,δ-dimethyl- or β,γ-dimethyl-δ-valerolactone,
α,β-diethyl- α,γ-diethyl-, α,δ-dipropyl or β,γ-dipropyl-δ-valerolactone,
α-ethyl-β-methyl-, or α-propyl-δ-methyl-δ-valerolactone,
α,β,γ-trimethyl- or α,β-dimethyl-γ-propyl-δ-valerolactone,
α,β,γ,δ-tetramethyl-, α,β,γ,δ-tetraethyl-δ-methyl-,
α,α,β,β,γ,γ-hexamethyl-, α,α,β,β,γ,γ,δ-heptamethyl- or α,α,β,β,γ,γ,δ,δ-octamethyl-δ-valerolactone,
ε-caprolactone, -methyl-, β-methyl-, γ-methyl-, δ-methyl- or ε-mehtyl-ε-caprolactone,
α,α-dimethyl-, α,γ-diethyl-α-propyl-ε-methyl-,
α,γ,δ,ε-tetraethyl-, α-propyl-β,ε,ε-triethyl-γ-methyl-,
α,α,β,β,γ,γ-hexamethyl- or α,α,β,β,γ,γ,ε-heptamethyl-ε-ethyl-ε-caprolactone instead of γ-butyrolactone,
N-[(10,11-dihydro-5H-dibenzo[a,d]cyclohepten-5-yl) methyl]-4-hydroxy-2-methylbutyramide, -4-hydroxy-3-methylbutyramide, -4-hydroxy-valeramide, M.P. 112–113° C., -4-hydroxy-2-ethylbutyramide, -4-hydroxy-3-ethylbutyramide,
-4-hydroxy-caproamide, -4-hydroxy-2-propylbutyramide,
-4-hydroxy-3-propylbutyramide, -4-hydroxy-heptanamide,
-4-hydroxy-2,2-dimethylbutyramide,
-4-hydroxy-3,3-dimethylbutyramide,
-4-hydroxy-4-methylvaleramide,
-4-hydroxy-2,2-diethylbutyramide,
-4-hydroxy-3,3-diethylbutyramide,
-4-hydroxy-4-ethylcaproamide,
-4-hydroxy-2,2-dipropylbutyramide,
-4-hydroxy-3,3-dipropylbutyramide,
-4-hydroxy-4-propylheptanamide,
-4-hydroxy-2,3-dimethylbutyramide,
-4-hydroxy-2,4-dimethylbutyramide,
-4-hydroxy-3-methylvaleramide,
-4-hydroxy-2-methyl-3-ethylbutyramide,
-4-hydroxy-2-ethyl-3-propylbutyramide,
-4-hydroxy-2-propylvaleramide,
-4-hydroxy-2,3-dimethylvaleramide,
-4-hydroxy-2-methyl-3-ethylheptanamide,
-4-hydroxy-2,2,3-trimethylvaleramide,
-4-hydroxy-2,2-dimethyl-3-ethylheptanamide,
-4-hydroxy-2,2-dimethyl-3,3-diethylvaleramide,
-4-hydroxy-2,2,3,3,4-pentamethylheptanamide, -5-hydroxyvaleramide, M.P. 102° C., -5-hydroxy-2-methylvaleramide,
-5-hydroxy-3-methylvaleramide, -5-hydroxy-5-methylvaleramide,
-5-hydroxycaproamide,
-5-hydroxy-2-ethylvaleramide, -5-hydroxy-3-ethylvaleramide,
-5-hydroxy-4-ethylvaleramide, -5-hydroxy-heptanamide,
-5-hydroxy-2-propylvaleramide,
-5-hydroxy-3-propylvaleramide, -5-hydroxy-4-propylvaleramide,
-5-hydroxyoctanamide,
-5-hydroxy-2,2-dimethylvaleramide,
-5-hydroxy-3,3-dimethylvaleramide,
-5-hydroxy-4,4-dimethylvaleramide,
-5-hydroxy-5-methylcaproamide,
-5-hydroxy-2,2-diethylvaleramide,
-5-hydroxy-3,3-diethylvaleramide,
-5-hydroxy-4,4-diethylvaleramide,
-5-hydroxy-5-ethylheptanamide,
-5-hydroxy-2,3-dimethylvaleramide,
-5-hydroxy-2,4-dimethylvaleramide,
-5-hydroxy-2-methylcaproamide,
-5-hydroxy-3,4-dimethylvaleramide,
-5-hydroxy-2,3-diethylvaleramide,
-5-hydroxy-2,4-diethylvaleramide,
-5-hydroxy-2-propyloctanamide,
-5-hydroxy-3,4-dipropylvaleramide,
-5-hydroxy-2-ethyl-3-methylvaleramide,
-5-hydroxy-2-propylcaproamide,
-5-hydroxy-2,3,4-trimethylvaleramide,
-5-hydroxy-2,3-dimethyloctanamide,
-5-hydroxy-2,3,4-trimethylcaproamide,
-5-hydroxy-2,3-diethyl-4,4-diethylcaproamide,
-5-hydroxy-2,2,3,3,4,4-hexamethylvaleramide,
-5-hydroxy-2,2,3,3,4,4-hexaamethylcaproamide,
-5-hydroxy-2,2,3,3,4,4,5-heptamethylcaproamide,
-6-hydroxycaproamide,
-6-hydroxy-2-methylcaproamide,
-6-hydroxy-3-methylcaproamide,
-6-hydroxy-4-methylcaproamide,
-6-hydroxy-5-methylcaproamide,
-6-hydroxy-heptanamide,
-6-hydroxy-2,2-dimethylcaproamide,
-6-hydroxy-2,4-diethyl-2-propylheptanamide,
-6-hydroxy-2,4,5-triethyloctanamide,
-6-hydroxy-2-propyl-3,5-diethyl-4-methyloctanamide,
-6-hydroxy-2,2,3,3,4,4-hexamethylcaproamide and
-6-hydroxy-2,2,3,3,4,4,5-heptamethyloctanamide, are obtained.

EXAMPLE 2

To a solution of N-[(10,11-dihydro-5H-dibenzo[a,d]-cyclohepten-5-yl)methyl]-5-hydroxyvaleramide (24.0 g.), prepared as described in Example 1, in 400 ml. of toluene is added phosphorous oxychloride (150 ml.) and the reaction mixture is refluxed for three hours. After cooling, dilution with petroleum ether precipitates an oil. The supernatant layer is decanted and the residual oil is dissolved in benzene. The benzene solution is washed with water, 10% sodium hydroxide solution and then water again, dried and subjected to reflux for 40 minutes to complete the quaternary salt formation. The resulting precipitate is recrystallized from acetone to give 1,3,4,5,6,10,11,15b - octahydrobenzo[6,7]cyclohepta[1,2,3 - de]pyrido[2,1-a]isoquinolinium chloride (IV, Alk=$CH_2CH_2CH_2CH_2$ and X=Cl)

M.P. 205–207° C.

The procedure of Example 2 may be followed to make other quaternary salts of Formula IV. Examples of such quaternary salts are listed in Tables I, II and III. In each of these cases an equivalent amount of the starting material listed is used instead of N-[(10,11-dihydro-5H-dibenzo[a,d]cyclohepten - 5 - yl)methyl] - 5-hydroxyvaleramide used in Example 2. The particular starting materials listed below are described in Example 1.

TABLE I

| Example | Starting material (Formula III in which Y=OH and Alk is structure listed below) | Product [(prefix listed below)-1,4,5,9,10,14b-hexahydro-3H-benzo[6,7]cyclohepta-[1,2,3-de]pyrrolo[2,1-a]-isoquinolinium chloride] |
|---|---|---|
| 3 | $CH_2CH_2CH_2$ | Parent quaternary salt, 1,4,5,9,10, 14b-hexahydro-3H-benzo[6,7]cyclohepta[1,2,3-de]-pyrrolo[2,1-a]isoquin-olinium chloride, M.P. 209° C. |
| 4 | $CH(CH_3)CH_2CH_2$ | 5-methyl-. |
| 5 | $CH_2CH(CH_3)CH_2$ | 4-methyl-. |
| 6 | $CH_2CH_2CH(CH_3)$ | 3-methyl-. |
| 7 | $CH(C_2H_5)CH_2CH_2$ | 5-ethyl-. |
| 8 | $CH_2CH(C_2H_5)C_2$ | 4-ethyl-. |
| 9 | $CH_2CH_2CH_2(C_2H_5)$ | 3-ethyl-. |
| 10 | $CH(C_3H_7)CH_2CH_2$ | 5-propyl-. |
| 11 | $CH_2CH(C_3H_7)CH_2$ | 4-propyl-. |
| 12 | $CH_2CH_2CH(C_3H_7)$ | 3-propyl-. |
| 13 | $C(CH_3)_2CH_2CH_2$ | 5,5-dimethyl-. |
| 14 | $CH_2C(CH_3)_2CH_2$ | 4,4-dimethyl-. |
| 15 | $CH_2CH_2C(CH_3)_2$ | 3,3-dimethyl-. |
| 16 | $C(C_2H_5)_2CH_2CH_2$ | 5,5-diethyl-. |
| 17 | $CH_2C(C_2H_5)_2CH_2$ | 4,4-diethyl-. |
| 18 | $CH_2CH_2C(C_2H_5)_2$ | 3,3-diethyl-. |
| 19 | $C(C_3H_7)_2CH_2CH_2$ | 5,5-dipropyl-. |
| 20 | $CH_2C(C_3H_7)_2CH_2$ | 4,4-dipropyl-. |
| 21 | $CH_2CH_2C(C_3H_7)_2$ | 3,3-dipropyl-. |
| 22 | $CH(CH_3)CH(CH_3)CH_2$ | 5,4-dimethyl-. |
| 23 | $CH(CH_3)CH_2CH(CH_3)$ | 5,3-dimethyl-. |
| 24 | $CH_2CH(CH_3)CH(CH_3)$ | 4,3-dimethyl-. |
| 25 | $CH(CH_3)CH(C_2H_5)CH_2$ | 5-methyl-4-ethyl-. |
| 26 | $CH(C_2H_5)CH(C_3H_7)CH_2$ | 5-ethyl-4-propyl-. |
| 27 | $CH_2CH(C_3H_7)CH(CH_3)$ | 4-propyl-3-methyl-. |
| 28 | $CH(CH_3)CH(CH_3)CH(CH_3)$ | 5,4,3-trimethyl-. |
| 29 | $CH(CH_3)CH(C_2H_5)CH(C_3H_7)$ | 5-methyl-4-ethyl-3-propyl-. |
| 30 | $C(CH_3)_2CH(CH_3)CH(CH_3)$ | 5,5,4,3-tetramethyl-. |
| 31 | $C(CH_3)_2CH(C_2H_5)CH(C_3H_7)$ | 5,5-dimethyl-4-ethyl-3-propyl-. |
| 32 | $C(CH_3)_2C(C_2H_5)_2CH(CH_3)$ | 5,5,3-trimethyl-4,4-diethyl-. |
| 33 | $C(CH_3)_2C(CH_3)_2C(CH_3)(C_2H_5)$ | 5,5,4,4,3-pentamethyl-3-propyl-. |

TABLE II

| Example | Starting material (Formula III in which Y=OH and Alk is structure listed below) | Product [(prefix listed below)-1,3,4,5,6,10,11,15b-octahydro-benzo 6.7]-cyclohepta]1,2,3-de]-pyrido[2,1-a] isoquinolinium chloride] |
|---|---|---|
| 34 | CH(CH₃)CH₂CH₂CH₂ | 6-methyl-. |
| 35 | CH₂(CH₃)CH₂CH₂ | 5-methyl-. |
| 36 | CH₂CH₂CH(CH₂)CH₂ | 4-methyl-. |
| 37 | CH₂CH₂CH₂CH(CH₃)CH | 3-methyl-. |
| 38 | CH(C₂H₅)CH₂CH₂CH₂ | 6-ethyl-. |
| 39 | CH₂CH(C₂H₅)CH₂CH₂ | 5-ethyl-. |
| 40 | CH₂CH₂CH(C₂H₅)CH₂ | 4-ethyl-. |
| 41 | CH₂CH₂CH₂CH(C₂H₅) | 3-ethyl-. |
| 42 | CH(C₃H₇)CH₂CH₂CH₂ | 6-propyl-. |
| 43 | CH₂CH(C₃H₇)CH₂CH₂ | 5-propyl-. |
| 44 | CH₂CH₂CH(C₃H₇)CH₂ | 4-propyl-. |
| 45 | CH₂CH₂CH₂CH(C₃H₇) | 3-propyl-. |
| 46 | C(CH₃)₂CH₂CH₂CH₂ | 6,6-dimethyl-. |
| 47 | CH₂C(CH₃)₂CH₂CH₂ | 5,5-dimethyl-. |
| 48 | CH₂CH₂C(CH₃)CH₂ | 4,4-dimethyl-. |
| 49 | CH₂CH₂CH₂C(CH₃)₂ | 3,3-dimethyl. |
| 50 | C(C₂H₅)₂CH₂CH₂CH₂ | 6,6-diethyl-. |
| 51 | CH₂C(C₂H₅)₂CH₂CH₂ | 5,5-diethyl-. |
| 52 | CH₂CH₂C(C₂H₅)₂CH₂ | 4,4-diethyl-. |
| 53 | CH₂CH₂CH₂C(C₂H₅)₂ | 3,3-diethyl-. |
| 54 | CH(CH₃)CH₃)CH₂CH₂ | 6,5-dimethyl-. |
| 55 | CH(CH₃)CH₂CH(CH₃)CH₂ | 6,4-dimethyl-. |
| 56 | CH(CH₃)CH₂CH₂CH(CH₃) | 6,3-dimethyl-. |
| 57 | CH₂CH(CH₃)CH₂CH(CH₃) | 5,3-dimethyl-. |
| 58 | CH(C₂H₅)CH(C₂H₅)CH₂CH₂ | 6,5-diethyl-. |
| 59 | CH(C₂H₅)CH₂CH(C₂H₅)CH₂ | 6,4-diethyl-. |
| 60 | CH(C₃H₇)CH₂CH₂CH(C₃H₇) | 6,3-dipropyl-. |
| 61 | CH₂CH(C₃H₇)CH₂(C₃H₇) | 5,3-dipropyl-. |
| 62 | CH(C₂H₅)CH(CH₃)CH₂CH₂ | 6-ethyl-5-methyl-. |
| 63 | CH(C₃H₇)CH₂CH₂CH(CH₃) | 6-propyl-3-methyl-. |
| 64 | CH(CH₃)CH(CH₃)CH(CH₃)CH₂ | 6,5,4-trimethyl-. |
| 65 | CH(CH₃)CH(CH₃)CH₂CH(C₃H₇) | 6,5-dimethyl-3-propyl. |
| 66 | CH(CH₃)CH(CH₃)CH(CH₃)CH(CH₃) | 6,5,4-3-tetramethyl-. |
| 67 | CH(C₂H₅)CH(C₂H₅)C(C₂H₅)₂CH(CH₃) | 6,5,4,4-tetraethyl-3-methyl-. |
| 68 | C(CH₃)₂C(CH₃)C(CH₃)₂CH₂ | 6,6,5,5,4,4-hexamethyl-. |
| 69 | C(CH₃)₂C(CH₃)(CH₃)₂CHCH₃ | 6,6,5,5,4,4,3-heptamethyl-. |
| 70 | C(CH₃)₂C(CH₃)₂C(CH₃)C(CH₃) | 6,6,5,5,4,4,3,3-octamethyl-. |

TABLE III

| Example | Starting material (Formula III in which Y=OH and Alk is structure listed below) | Product [(prefix listed below)-1,3,4,5,6,7,11,12,16b-octahydro-benz[o6.7]-cyclohepta[1,2,3-de]-azepino[2,1-a] isoquinolinium chloride] |
|---|---|---|
| 71 | CH₂CH₂CH₂CH₂CH₂ | Parent quaternary salt, 1,4,5,6,7,11,12,16b-octahydro-3H-benzo[6,7] cyclohepta-[1,2,3-de] azepino[2,1-a]iso-quinolinium chloride. |
| 72 | CH(CH₃)CH₂CH₂CH₂CH₂ | 7-methyl-. |
| 73 | CH₂CH(CH₃)CH₂CH₂CH₂ | 6-methyl-. |
| 74 | CH₂CH₂CH(CH₃)CH₂CH₂ | 5-methyl-. |
| 75 | CH₂CH₂CH₂CH(CH₃)CH₂ | 4-methyl-. |
| 76 | CH₂CH₂CH₂CH₂CH(CH₃) | 3-methyl-. |
| 77 | C(CH₃)₂CH₂CH₂CH₂CH₂ | 7,7-dimethyl-. |
| 78 | C(C₂H₅)(C₃H₇)CH₂CH(C₂H₅)CH₂CH₂CH(CH₃) | 7,5-diethyl-7-propyl-3-methyl-. |
| 79 | CH(C₂H₅)CH₂CH(C₂H₅)CH(C₂H₅)CH(C₂H₅) | 7,5,4,3-tetraethyl-. |
| 80 | CH(C₃H₇)CH(C₂H₅)CH(CH₃)CH₂C(C₂H₅)₂ | 7-propyl-6,33-triethyl-5-methyl-. |
| 81 | C(CH₃)₂C(CH₃)₂C(CH₃)₂CH₂CH₂ | 7,7,6,6,5,5,-hexamethyl-. |
| 82 | C(CH₃)₂C(CH₃)₂C(CH₃)₂CH₂C(CH₃)(C₂H₅) | 7,7,6,6,5,5,3-heptamethyl-3-ethyl-. |

EXAMPLE 83

To a solution of the quaternary salt, 1,4,5,9,10,14b-hexahydro - 3H - benzo[6,7]cyclohepta[1,2,3-di]pyrrolo-[2,1-a]isoquinolinium chloride (4.0 g.), describer in Example 3, in 100 ml. of methanol, sodium borohydride (4.0 g.) is added portionwise. The reaction mixture is refluxed for one hour. After removal of the solvent the residue is taken up in water and extracted with ether. The ether extract is dried and evaporated to dryness. The residue is crystallized from hexane to yield 1,3,4,5,5a,9,10,14 due is crystallized from hexane to yield 1,3,4,5,5a,9,10,14b - octahydrobenzo[6,7]cyclohepta[1,2,3 - de]pyrrolo [2,1-a]isoquinoline; (Isomer B) (I, R¹=H and Alk= CH₂CH₂CH₂), M.P. 112–113° C. The corresponding hydrochloric acid addition salt of this free base has M.P. 253–254° C. (recrystallized from acetone).

The above isomer B of Example 83 as well as the corresponding Isomer A, may also be prepared by following the procedure of Example 85, see below, by using an equivalent amount of quaternary salt noted in Example 83 instead of the quaternary salt noted in Example 85. Accordingly, 1,3,4,5,5a,9,10,14b - octahydrobenzo[6,7] cyclohepta[1,2,3-de]pyrrolo[2,1 - a]isoquinoline (Isomer A), M.P. 76–77° C., is obtained. The corresponding hydrochloric acid additon salt of the latter compound has M.P. 226° C.

EXAMPLE 84

The quaternary salt, 1,3,4,5,6,10,11,15b-octohydro-benzo[6,7]cyclohepta[1,2,3 - de]pyrido[2,1 - a]isoquinolinium chloride (1.3 g.), described in Example 2, is dissolved in 50 ml. of ethanol and subjected to hydrogenation at room temperature under atmospheric pressure in the presence of platinum oxide (50 mg.). After a reaction time of two hours, the catalyst is removed by filteration and the filtrate is evaporated to dryness. The residue is crystallized from hexane to afford 1,4,5,6,6a,10,11,15b-octahydro - 3H - benzo[6,7]cyclohepta[1,2,3-de]pyrido-[2,1-a]isoquinoline (Isomer B) (I, R¹=H and Alk= CH₂CH₂CH₂CH₂), M.P. 136° C. The corresponding hydrochloric acid addition salt of this free base has M.P. 235–236° C.

EXAMPLE 85

A mixture of the quaternary salt, 1,3,4,5,6,10,11,15b-octahydrobenzo[6,7]cyclohepta[1,2,3 - de]pyrido[2,1-a]isoquinolinium chloride (2.0 g.) and zinc dust (4.0 g.) in 40 ml. of concentrated hydrochloric acid and 150 ml. of ethanol is heated on a steam bath for one hour. The alcohol is removed by evaporation and the remainder of the mixture is rendered neutral with concentrated ammonia. The mixture is then extracted with benzene. The benzene extract is dried and evaporated to dryness. The residue is subjected to chromatography on 120 g. of neutral alumina (activity II). Elution with hexane affords 1,4,5,6,6a,10,11,15b-octahydro - 3H - benzo[6,7]cyclohepta-[1,2,3-de]pyrido[2,1-a]isoquinoline (Isomer B), identical with the product described in Example 84. Subsequent elution with benzene affords the corresponding Isomer A. Recrystallization of this Isomer A from hexane affords crystals, M.P. 90–92° C.

The hydrochloride addition salt of 1,4,5,6,6a,10,11,15b-octahydro - 3H - benzo[6,7]cyclohepta[1,2,3-de]pyrido[2,1-a]isoquinoline (Isomer A) has M.P. 255–260° C., after recrystallization from acetone.

The procedures of Examples 83, 84 and 85 and the procedure of Example 85 may be followed to prepare the B or A isomers, respectively, of the compounds of Formula I noted in those examples or other benzocycloheptaisoquinoline derivatives of Formula I in which $R^1$ is a hydrogen. In each case an equivalent amount of appropriate starting material, a quaternary salt of Formula IV to give the desired product is used in place of the quaternary salts noted in Examples 83, 84 and 85. Examples of such benzocycloheptaisoquinoline derivatives which may be prepared by these procedures are listed in Tables IV, V and VI with a notation referring to the source of the appropriate starting material.

TABLE IV

| Example | Number of example describing quaternary salt starting material | Product [(prefix listed below)-1,3,4,5,5a,9,10,14b-octahydrobenzo[6,7]cyclohepta[1,2,3-de]-pyrrolo[2,1-a]isoquinoline] |
|---|---|---|
| 86 | 4 | 5-methyl-. |
| 87 | 5 | 4-methyl-. |
| 88 | 6 | 3-methyl-[Isomer B has the following characteristics in its Nmr. spectrum (CDCl₃)]: 7.8 (H), 7.4–6.65 (6H), 4.49 (H), 3.3–1.6 (12 H), 1.38 (CH₃) |
| 89 | 7 | 5-ethyl-. |
| 90 | 8 | 4-ethyl-. |
| 91 | 9 | 3-ethyl-. |
| 92 | 10 | 5-propyl-. |
| 93 | 11 | 4-propyl-. |
| 94 | 12 | 3-propyl-. |
| 95 | 13 | 5,5 dimethyl-1. |
| 96 | 14 | 4,4 dimethyl-. |
| 97 | 15 | 3,3 dimethyl-. |
| 98 | 16 | 5,5 diethyl-. |
| 99 | 17 | 4,4 diethyl-. |
| 100 | 18 | 3,3 diethyl-. |
| 101 | 19 | 5,5 dipropyl-. |
| 102 | 20 | 4,4 dipropyl-. |
| 103 | 21 | 3,3 dipropyl-. |
| 104 | 22 | 5,4 dimethyl-. |
| 105 | 23 | 5,3 dimethyl-. |
| 106 | 24 | 4,3-dimethyl-. |
| 107 | 25 | 5-methyl-4-ethyl-. |
| 108 | 26 | 5-ethyl-4-propyl-. |
| 109 | 27 | 4-propyl-3-methyl-. |
| 110 | 28 | 5,4,3-trimethyl-. |
| 111 | 29 | 5-methyl-4-ethyl-3-propyl-. |
| 112 | 30 | 5,5,4,3-tetramethyl-. |
| 113 | 31 | 5,5-dimethyl-4-ethyl-3-propyl-. |
| 114 | 32 | 5,5,3-trimethyl-4,4-diethyl-. |
| 115 | 33 | 5,5,4,4,3-pentamethyl-3-propyl-. |

TABLE V

| Example | Number of example describing quaternary salt starting material | Product [(prefix listed below)-1,4,5,6,6a,10,11,15b-octahydro-3H-benzo[6,7]cyclohepta[1,2,3-de]-pyridol[2,1-a]isoquinoline] |
|---|---|---|
| 116 | 34 | 6-methyl-. |
| 117 | 35 | 5-methyl-. |
| 118 | 36 | 4-methyl-. |
| 119 | 37 | 3-methyl-. |
| 120 | 38 | 6-ethyl-. |
| 121 | 39 | 5-ethyl-. |
| 122 | 40 | 4-ethyl-. |
| 123 | 41 | 3-ethyl-. |
| 124 | 42 | 6-propyl-. |
| 125 | 43 | 5-propyl-. |
| 126 | 44 | 4-propyl-. |
| 127 | 45 | 3-propyl-. |
| 128 | 46 | 6,6-dimethyl-. |
| 129 | 47 | 5,5-dimethyl-. |
| 130 | 48 | 4,4-dimethyl-. |
| 131 | 49 | 3,3-dimethyl-. |
| 132 | 50 | 6,6-diethyl-. |
| 133 | 51 | 5,5-diethyl-. |
| 134 | 52 | 4,4-diethyl-. |
| 135 | 53 | 3,3-diethyl-. |
| 136 | 54 | 6,5-dimethyl-. |
| 137 | 55 | 6,4-dimethyl-. |
| 138 | 56 | 6,3-dimethyl-. |
| 139 | 57 | 5,3-dimethyl-. |
| 140 | 58 | 6,5-diethyl-. |
| 141 | 59 | 6,4-diethyl-. |
| 142 | 60 | 6,3-dipropyl-. |
| 143 | 61 | 6,3-dipropyl-. |
| 144 | 62 | 6-ethyl-5-methyl-. |
| 145 | 63 | 6-propyl-3-methyl-. |
| 146 | 64 | 6,5,4-trimethyl-. |
| 147 | 65 | 6,5-dimethyl-3-propyl-. |
| 148 | 66 | 6,5,4,3-tetramethyl-. |
| 149 | 67 | 6,5,4,4-tetraethyl-3-methyl-. |
| 150 | 68 | 6,6,5,5,4,4-hexamethyl-. |
| 151 | 69 | 6,6,5,5,4,4,3-heptamethyl-. |
| 152 | 70 | 6,6,5,5,4,4,3,3-octamethyl-. |

TABLE VI

| Example | Number of example describing quaternary salt starting material | Product [(prefix listed below)-1,3,4,5,6,7,7a,11,12,16b-decahydrobenzo[6,7]-cyclohepta[1, 2, 3-de]-azepino[2,1-a]isoquinoline] |
|---|---|---|
| 153 | 71 | Parent base 1, 3, 4, 5, 6, 7, 7a, 11, 12, 16b-decahydrobenzo[6, 7]cyclohepta[1, 2, 3-de]-azepino[2,1-a]isoquinoline. |
| 154 | 72 | 7-methyl-. |
| 155 | 73 | 6-methyl-. |
| 156 | 74 | 5-methyl-. |
| 157 | 75 | 4-methyl-. |
| 158 | 76 | 3-methyl-. |
| 159 | 77 | 7,7-dimethyl-. |
| 160 | 78 | 7,5-diethyl-7-propyl-3-methyl-. |
| 161 | 79 | 7,5,4,3-tetraethyl-. |
| 162 | 80 | 7-propyl-6,3,3-triethyl-5-methyl-. |
| 163 | 81 | 7,7,6,6,5,5-hexamethyl-. |
| 164 | 82 | 7,7,6,6,5,5,3-heptamethyl-3-ethyl-. |

EXAMPLE 165

To a warm solution of the benzocycloheptaisoquinoline, 1,4,5,6,6a,10,11,15b - octahydro - 3H - benzo[6,7]cyclohepta[1,2,3 - de]pyrido[2,1 - a]isoquinoline (Isomer B) (0.7 g.), described in Example 84, in 18 ml. of water, 4 ml. of acetic acid and 5 ml. of tetrahydrofuran, mercuric acetate (3.08 g.) is added portionwise. The mixture is boiled for one hour. Solid mercurous acetate is collected on a filter and the filtrate is rendered alkaline with 10% aqueous sodium hydroxide and extracted with ether. The ether extract is dried, and then treated with gaseous hydrochloric acid. The resulting precipitate is collected and recrystallized from acetone to afford a product identical to 1,3,4,5,6,10,11,15b - octahydrobenzo-[6,7]cyclohepta[1,2,3 - de]pyrido[2,1 - a]isoquinolinium chloride obtained in Example 2.

The same product is isolated when the corresponding Isomer A, described in Example 85, instead of above Isomer B, is used as the starting material.

In the same manner, but using any of the A or B isomers of the benzocycloheptaisoquinolines listed in Examples 83 and 86 to 164 instead of the benzocycloheptaisoquinoline of this example, the corresponding quaternary salts of Formula IV are obtained.

EXAMPLE 166

A mixture of 10,11 - dihydro - 5H - dibenzo[a,d]cycloheptene - 5 - methylamine (20.0 g.), 5 - chlorovaleric acid chloride (19.2 g.) and sodium carbonate (35.0 g.) in 250 ml. of benzene is stirred and subjected to reflux for 16 hours. The reaction mixture is diluted with water. The benzene layer is separated and washed with water, dried and evaporated to dryness. The residue is crystallized from benzene-hexane to afford the haloamide N-[(10,11-dihydro - 5H - dibenzo[a,d]cyclohepten - 5 - yl)methyl] - 5 - chlorovaleramide (III,

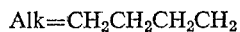

and Y=Cl), M.P., 98–99° C.

The procedure of Example 166 may be followed to make other haloamides of this invention of Formula III in which Alk is as defined above and Y is a chlorine by using an appropriate ω-haloalkanoic acid halide, described above, instead of 5-chlorovaleric acid chloride.

The above N - [(10,11 - dihydro - 5H - dibenzo[a,d]cyclohepten - 5 - yl)methyl] - 5 - chlorovaleramide, and the other haloamides of this invention may be converted to the corresponding quaternary salts of Formula IV of this invention for example, the quaternary salts described in Examples 2 to 82, by subjecting said haloamides to the conditions of the Bischler-Napieralski reaction, for example, the conditions described in the procedure of Example 2.

EXAMPLE 167

A solution of chloromethyl methyl ether (40.2 g., 0.5 mole, freshly distilled) in dry tetrahydrofuran (80 ml.) is prepared, and about 5 ml. of that solution are added to a stirred mixture of magnesium turnings (12.0 g., 0.5 g.-atom) and mercuric chloride (500 mg.) in tetrahydrofuran (20 ml.) until an exothermic reaction ensues. The flask is cooled to 0°±10° and the remainder of the chloromethyl methyl ether solution is added dropwise with thorough agitation. After completion of addition a solution of 10,11 - dihydro - 5H - dibenzo[a,d]cyclohepten-5-one (56.1 g., 0.25 mole) in tetrahydrofuran is added dropwise. The reaction mixture is stirred overnight at room temperature and the complex is hydrolyzed with ice-cold ammonium chloride solution. The aqueous layer is extracted with ether (3× 100 ml.) and the combined extracts are washed with sodium chloride solution, dried and evaporated under reduced pressure to give 10,11 - dihydro - 5 - methoxymethyl - 5H - dibenzo[a,d]cyclohepten-5-ol as an oil with B.P. 143–144° C./0.05 mm., $\lambda_{max.}^{film}$ 3500 cm.$^{-1}$, 2820 cm.$^{-2}$.

EXAMPLE 168

A solution of 10,11 - dihydro - 5 - methoxymethyl-5H - dibenzo[a,d]cyclohepten - 5 - ol (52.0 g., 0.21 mole) and formic acid (60 ml.) is heated under refluxing conditions for three hours. The mixture is cooled, diluted with water (500 ml.) and the oil is extracted into benzene. Evaporation of the solvent yields the crude aldehyde as a viscous oil.

The product is stirred overnight at room temperature with a solution of "Girard-T" reagent (40 g.) in methanol (400 ml.). The precipitate is combined with the residue obtained on evaporation of the methanol. The Girard adduct is dissolved in water and the solution is extracted with ether (6× 100 ml.) to remove non-carbonylic impurities. Hydrolysis of the adduct is effected by stirring the aqueous solution overnight (25°) with 40% sulfuric acid. The precipitated product is filtered off, washed well with water and dried to yield 10,11 - dihydro - 5H-dibenzo[a,d]cycloheptene - 5 - carboxaldehyde as a solid with M.P. 76–77° C. which may be purified by distillation (M.P. 135–138° C./0.2–0.3 mm.) or recrystallization from cyclohexane to M.P. 78° C., $\lambda_{max.}^{CHCl}$ 2700 (C–H stretching); 1720 cm.$^{-1}$ (CHO).

The compound is also characterized as the 2,4-dinitrophenylhydrozone, M.P. 217° C. (from acetic acid)

$\lambda_{max.}^{CHCl_3}$ 3300 (NH); 1610 (C=N); 1315, 1510 cm.$^{-1}$ (NO$_2$).

EXAMPLE 169

By subjecting a mixture of 10,11-dihydro-5H-dibenzo[a,d]cycloheptene-5-carboxaldehyde (2.2 g.), described in Example 168, and 5-aminovaleric acid ethyl ester (1.45 g.) and zinc dust (3.0 g.) in 3.0 ml. of acetic acid and 100 ml. of benzene, to a two hour reflux, followed by removal of the excess zinc by filtration, addition of dilute sodium hydroxide solution to render the mixture alkaline and extraction with benzene affords the cyclic amide, N-[(10,11-dihydro-5H - dibenzo[a,d]cyclohepten - 5 - yl)methyl]-2-piperidone, $\lambda_{max.}^{CHCl_3}$ 1650 cm.$^{-1}$, as an oil. Further treatment of this oil according to the conditions of the Bischler-Napieralski reaction described in Example 2, yields a product identical with the quaternary salt, 1,3,4,5,6,10,11,15b-octahydrobenzo[6,7]cyclohepta[1,2,3-de]pyrido[2,1 - a]isoquinolinium chloride obtained in Example 2.

The procedure of Example 169 may be followed to make other quaternary salts of Formula IV, for example, the quaternary salts described in Examples 3 to 82. In each case an equivalent amount of the appropriate amino ester of general formula NH$_2$—Alk—COOR$^{12}$, in which Alk and R$^{12}$ are as described above, is used instead of 5-aminovaleric acid ethyl ester.

EXAMPLE 170

The quaternary salt, 1,2,3,4,5,6,10,11,15b - octahydrobenzo[6,7]cyclohepta[1,2,3 - de]pyrido[2,1 - a]isoquinolinium chloride (0.001 mole), described in Example 2, is added portionwise to the alkyl magnesium halide, methyl magnesium iodide (0.002 mole) in 100 ml. of ether. The reaction mixture is refluxed for 40 minutes. Excess methyl magnesium iodide is destroyed by the slow addition of a saturated solution of ammonium chloride. The ether layer is separated, dried and concentrated to dryness. The residue is subjected to chromatography on alumina (activity-1). Elution with benzene gives 6a-methyl-1,4,5,6,6a,10,11, 15b-octahydro-3H-benzo[6,7]cyclohepta[1,2,3 - de]pyrido[2,1-a]isoquinoline (I, R$^1$=CH$_3$ and Alk=CH$_2$CH$_2$CH$_2$CH$_2$)

M.P. 119–120° C., after recrystallization from hexane. This corresponding hydrochloride acid addition salt of this benzocycloheptaisoquinoline derivative has M.P. 270° C. (dec.) after recrystallization from methanol-ether.

The procedure of Example 170 may be followed to prepare the remaining benzocycloheptaisoquinoline derivatives of this invention of Formula I in which R$^1$ represents a lower alkyl, by using the appropriate quaternary salt of Formula IV, for example the quaternary salts described in Examples 2 to 82, together with the appropriate lower alkyl magnesium halide. For example, in this manner the 6a-methyl-, 6a-ethyl and 6a-propyl analogs of the benzocycloheptaisoquinoline derivatives described in Examples 83-164 are obtained by using the same quaternary salt starting material employed in the those examples together with the alkyl magnesium halides, methyl, ethyl or propyl magnesium bromide, respectively.

EXAMPLE 171

To freshly distilled 1-buten-3-one (5.4 g.), 1,7,8,12b-tetrahydrobenzo[1,2]cyclohepta[3,4,5-de]isoquinoline hydrochloride (5.4 g.) is added portionwise. The mixture is heated on a steam bath for 30 minutes, becoming homogenous and finally semi-solid. The mixture is diluted with ether and the resulting precipitate is collected on a filter and washed with ether. The precipitate is dissolved in 10% aqueous sodium hydroxide and extracted with ethyl acetate. The extract is dried and evaporated to dryness. The residue is crystallized from acetone-hexane to afford 1,3,4,6,6a,10,11,15b-octahydro-5H - benzo[6,7]cyclohepta[1,2,3-de]pyrido[2,1-a]isoquinolin-5-one, (VIII, $R^{13}$, $R^{14}$ and $R^{15}$=H), M.P. 150–155° C. This product is a mixture of the A and B isomers, which may be separated by chromatography on silica gel. Elution with 20% chloroform in benzene gives 1,3,4,6,6a,10,11,15b-octahydro-5H-benzo[6,7]cyclohepta[1,2,3 - de]pyrido[2,1 - a]isoquinolin-5-one (Isomer B), M.P. 202–203° C. after recrystallization from acetone-hexane. Elution with chloroform gives the corresponding Isomer B, M.P. 163–165° C., after recrystallization from acetone-hexane.

The procedure of Example 171 may be used to prepare other aminoketones of Formula VIII. In each case an equivalent amount of an appropriate unsaturated ketone of formula

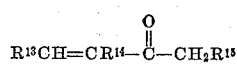

in which $R^{13}$, $R^{14}$ and $R^{15}$ are as defined above is used instead of 1-buten-3-one. Examples of such aminoketones are listed in Table VII together with the appropriate unsaturated ketone used as starting material.

TABLE VII

| | Starting material $(R^{13}CH=CR^{14}-\overset{O}{\underset{\|}{C}}-CH_2R^{15})$ | | | Amino ketone product (Formula VIII) [(prefix listed below)- 1,3,4,6,6a,10,11,15b-octahydro- 5H - benzo[6,7]-cyclohepta[1,2,3 - de]pyrido[2,1-a]-isoquinolin-5-one) |
|---|---|---|---|---|
| Example | $R^{13}$ | $R^{14}$ | $R^{15}$ | |
| 172 | CH₃ | H | H | 3-methyl-. |
| 173 | H | CH₃ | H | 4-methyl-. |
| 174 | H | H | CH₃ | 6-methyl-. |
| 175 | C₂H₅ | H | H | 3-ethyl-. |
| 176 | H | C₂H₅ | H | 4-ethyl-. |
| 177 | H | H | C₂H₅ | 6-ethyl-. |
| 178 | C₃H₇ | H | H | 3-propyl-. |
| 179 | H | C₃H₇ | H | 4-propyl-. |
| 180 | H | H | C₃H₇ | 6-propyl-. |

EXAMPLE 181

A solution of 1,3,4,6,6a,10,11,15b-octahydro-5H-benzo[6,7]cyclohepta[1,2,3 - de]pyrido[2,1 - a]isoquinolin-5-one (3.0 g.), described in Example 171 in 50 ml. of acetic acid, 3.0 ml. of ethanedithiol and 3.0 ml. of boron trifluoride etherate is left at room temperature for 18 hours and then poured on water and extracted with ether. The organic phase is washed to neutral with a saturated solution of sodium carbonate, dried with magnesium sulfate and concentrated to dryness. The residue is triturated with ether and the solid collected yielding 1,3,4,6,6a,10,11,15b-octahydro - 5H - benzo[6,7]cyclohepta[1,2,3-de]pyrido-[2,1-a]isoquinolin-5-one ethylene dithioketal, M.P. 220–225° C.

If desired this product may be separated into its A and B isomers by chromatography on silica gel. The corresponding Isomer B has M.P. 150° after elution with chloroform and recrystallization from methanol-hexane and the corresponding Isomer A, has M.P. 225–230° C. after elution with methanol and recrystallization from methanol-hexane.

The procedure of Example 181 may be followed to prepare the corresponding ethylene dithioketals of the other aminoketones of ketones of Formula VIII of this invention, listed in Examples 172–180. In each case the appropriate aminoketone is used as starting material instead of 1,3,4,6,6a,10,11,15b - octahydro - 5H - benzo[6,7]cyclohepta[1,2,3 - de]pyrido[2,1 - a]isoquinolin-5-one.

EXAMPLE 182

To a boiling solution of 1,3,4,6,6a,10,11,15b-octahydro-5H - benzo[6,7]cyclohepta[1,2,3 - de]pyrido[2,1 - a]isoquinolin-5-one ethylene dithioketal (17.0 g.), described in Example 181, in 1000 ml. of tetrahydrofuran, Raney nickel (170 g.) is added portionwise and the reaction mixture is refluxed for six hours. After decanting and concentrating to a minimum volume, it is poured on water and extracted with ether, dried and concentrated to an oil. This oil is dissolved in ether and treated with gaseous hydrochloric acid. The resulting precipitate is recrystallized from isopropanol-acetone to yield a product identical with 1,4,5,6,6a,10,11,15b - octahydro - 3H - benzo[6,7]cyclohepta[1,2,3 - de]pyrido[2,1 - a]isoquinoline (Isomer A) hydrochloride described in Example 85.

The procedure of Example 182 may be followed to prepare other benzocycloheptaisoquinolines of Formula I listed in Table VIII. In each case an equivalent amount of the appropriate thioketal of the aminoketones listed in Table VII, prepared according to the procedure described in Example 181, is used as the thioketal starting material instead of 1,3,4,6,6a,10,11,15b - octahydro - 5H - benzo[6,7]cyclohepta[1,2,3-de]pyrido[2,1-a]isoquinolin - 5-one ethylene dithioketal.

TABLE VIII

| Example | Starting material [(prefix listed below)-1,3,4,-6,6a,10,11,15b-octahydro-5H benzo[6,7] cyclohepta [1,2,3 de] pyrido[2,1 a]-isoquinolin 5-one-ethylene dithioketal] | Product [(prefix listed below)-1,4,5,6,6a,10,11,15b-octahydro-3H benzo[6,7]cyclohepta [1,2,3-de]pyrido[2,1-a]-isoquinoline hydrochloride] |
|---|---|---|
| 183 | 3 methyl | 3 methyl. |
| 184 | 4 methyl | 4 methyl. |
| 185 | 6 methyl | 6 methyl. |
| 186 | 3 ethyl | 3 ethyl. |
| 187 | 4 ethyl | 4 ethyl. |
| 188 | 6 ethyl | 6 ethyl. |
| 189 | 3 propyl | 3 propyl. |
| 190 | 4 propyl | 4 propyl. |
| 191 | 6 propyl | 6 propyl. |

EXAMPLE 192

To a suspension of 1,3,4,6,6a,10,11,15b-octahydro-5H-benzo[6,7]cyclohepta[1,2,3 - de]pyrido[2,1 - a]isoquinolin-5-one Isomer A (2.0 g.), described in Example 171, in 50 ml. of methanol, sodium borohydride (2.5 g.) is added portionwise. The mixture is heated under refluxing conditions for one hour. After removal of the methanol under vacuum, water is added and the mixture is extracted with ethyl acetate. The extract is dried, concentrated to dryness. The residue is crystallized from ether-hexane to afford the free base, 1,4,5,6,6a,10,11,15b - octahydro - 3H-benzo[6,7]cyclohepta[1,2,3 - de]pyrido[2,1 - a]isoquinolin-5-ol, Isomer A M.P. 157–159° C. The corresponding hydrochloric acid addition salt of this free base has M.P. 290–295° C.

The corresponding acetic acid ester is prepared by reacting the above alcohol with acetic anhydride in presence of pyridine. The resulting 5-acetoxy-1,4,5,6,6a,10,11,15b-octahydro - 3H - benzo[6,7]cyclohepta[1,2,3 - de]pyrido-[2,1-a]isoquinoline is characterized by its N.M.R. spectrum showing a CH₃CO chemical shift at 2.1δ (CDCl₃). Its hydrochloride salts melts at 265–270° C.

Using the Isomer B of 1,3,4,6,6a,10,11,15b-octahydro-5H - benzo[6,7]cyclohepta[1,2,3 - de]pyrido[2,1 - a]isoquinoline described in Example 171, the corresponding alcohol B, M.P. 137–140° is isolated. The hydrochloric acid addition salt of this free base melts at 280–285° C.

These free bases may be converted to their corresponding tosylates or mesylates and reduced with lithium aluminum hydride or sodium amalgam, according to the methods described by Fieser and Fieser, cited above, pp. 292–294, see also O. H. Wheeler in "The Chemistry of the Carbonyl Group," cited above, to give a compound identical to 1,4,5,6,6a,10,11,15b - octahydro[1,2,3 - de]-pyrido[2,1-b]isoquinoline (Isomer A or Isomer B, respectively) described in Example 85.

The procedure of Example 192 may be followed to prepare the products listed in Table VIII. In each case the appropriate starting material, an aminoketone product listed in Table VII, is reduced to the corresponding 5-alcohol, converted to its corresponding tosylate or mesylate, and reduced again according to the above procedure.

EXAMPLE 193

A solution of 1,3,4,6,6a,10,11,15b - octahydro - 5H-benzo[6,7]cyclohepta[1,2,3 - de]pyrido[2,1 - a]isoquinolin-5-one (2.0 g.), described in Example 171, in 100 ml. of tetrahydrofuran is added to an ethyl magnesium iodide solution, prepared from 0.8 g. of magnesium and 5.2 g. of ethyl iodide in ether. The reaction mixture is subjected to reflux for half an hour and the excess of the Grignard reagent is destroyed with water. The reaction mixture is extracted with ether. The ether extract is dried and then evaporated to dryness to yield an oily residue. The residue is purified by chromatography on alumina. Elution with benzene-acetone affords the free base, 5 - ethyl - 1,4,5,6, 6a,10,11,15b - octahydro - 3H - benzo[6,7]cyclohepta [1,2,3-de]pyrido[2,1-a]isoquinolin-5-ol, $\lambda_{max.}^{mull}$ 3400 cm.$^{-1}$ (broad). The corresponding hydrochloric acid addition salt of this product has M.P. 263° C. (dec.).

The latter free base may be dehydrated according to the conditions described by R. B. Wagner and H. D. Zook, in "Synthetic Organic Chemistry," John Wiley and Sons, New York, 1953, pp. 32–35, preferably with p-toluenesulphonic acid in benzene solution, followed by hydrogenation according to the conditions described in above Example 84, to give 5 - ethyl - 1,4,5,6,6a,10,11,15b - octahydro - 3H - benzo[6,7]cyclohepta[1,2,3 - de]pyrido [2,1-a]isoquinoline, $\lambda_{max.}^{EtOH}$ 263 mµ (ε=582) and 270 mµ (ε=490).

The procedure of Example 193 may be followed to prepare 5-methyl- and 5 - propyl - 1,4,5,6,6a,10,11,15b-octahydro - 3H - benzo[6,7]cyclohepta[1,2,3 - de]pyrido [2,1-a]isoquinoline. In each case methyl or propyl magnesium iodide is used respectively, instead of ethyl magnesium iodide, followed by the above described dehydration and reduction steps.

Similarly, the procedure of Example 193 may be followed to prepare the 5-methyl-, 5-ethyl- and 5-propyl-derivatives of the aminoketone products listed in Table VIII. In each case the appropriate starting material, an aminoketone product listed in Table VII, is reacted with methyl, ethyl or propyl magnesium bromide, respectively, and the resulting free base containing a hydroxyl group is dehydrated and hydrogenated according to the above procedure.

We claim:
1. A compound of the formula

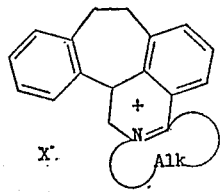

wherein Alk represents

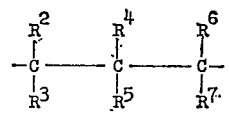

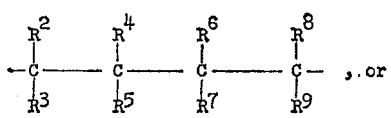

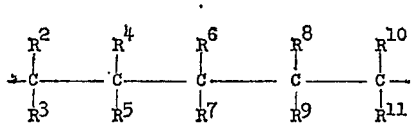

in which $R^2$, $R^3$, $R^4$, $R^5$, $R^6$, $R^7$, $R^8$, $R^9$, $R^{10}$ and $R^{11}$ are the same or different selected from the group consisting of hydrogen and lower alkyl, containing from one to six carbon atoms in a straight chain and from one to four carbon atoms in a branched chain and X is the nucleophilic residue derived from a condensing agent used in the Bischler-Napieralski reaction selected from the class consisting of chlorine, bromine and phosphate.

2. 1,3,4,5,6,10,11,15b - octahydrobenzo[6,7]cyclohepta [1,2,3 - de] - pyrido[2,1 - a]isoquinolinium chloride, as claimed in claim 1.

3. 1,4,5,9,10,14b - hexahydro - 3H - benzo[6,7]cyclohepta[1,2,3 - de] - pyrrolo[2,1 - a]isoquinolinium chloride, as claimed in claim 1.

References Cited
UNITED STATES PATENTS 3,361,751   1/1968   Humber _____ 260—289 Q

OTHER REFERENCES

Barclay et al.: Can. Jour. Chem., vol. 40, 1664–71 (1962).

DONALD G. DAUS, Primary Examiner

U.S. Cl. X.R.

260—283 R, 283 S, 283 SY, 286 R, 289 R, 293.72, 562 P, 593 R, 999

PO-1050
(5/69)

UNITED STATES PATENT OFFICE
CERTIFICATE OF CORRECTION

Patent No. 3,657,250          Dated April 18, 1972

Inventor(s) Francois T. Bruderlein and Leslie G. Humber

It is certified that error appears in the above-identified patent and that said Letters Patent are hereby corrected as shown below:

Column 8, line 36, "or -propyl-γ-butyrolactone" should read -- or γ-propyl-γ-butyrolactone --

Column 8, line 40, "or γ,γ-dipropyl-γ,γ-butyrolactone" should read -- or γ,γ-dipropyl-γ-butyrolactone --

Column 8, line 42, "α,α-dimethyl-,β,β-dimethyl- or γ,γ-dimethyl-γ-butyrolactone" should read -- α,β-dimethyl-, α,γ-dimethyl- or β,γ-dimethyl-γ-butyrolactone --

Column 8, line 43, "or -propyl-γ-methyl-γ-butyrolactone" should read -- or β-propyl-γ-methyl-γ-butyrolactone --

Column 8, line 54, "mehtyl" should read -- methyl --

Column 8, line 66, "ε-caprolactone, -methyl-," should read -- ε-caprolactone, α-methyl-, --

Column 10, line 55, Example 8, "$CH_2CH(C_2H_5)C_2$" should read -- $CH_2CH(C_2H_5)CH_2$ --

Column 11, third line of Column heading on right "octahydro-benzo 6.7]-" should read -- octahydro-benzo[6,7]- --

Column 11, Example 35, "$CH_2(CH_3)CH_2CH_2$" should read -- $CH_2CH(CH_3)CH_2CH_2$ --

Column 11, Example 37, "$CH_2CH_2CH_2CH(CH_3)CH$" should read -- $CH_2CH_2CH_2CH(CH_3)$ --

..2

PO-1050
(5/69)

UNITED STATES PATENT OFFICE
CERTIFICATE OF CORRECTION

Patent No. 3,657,250            Dated    April 18, 1972

Inventor(s) Francois T. Bruderlein and Leslie G. Humber

It is certified that error appears in the above-identified patent and that said Letters Patent are hereby corrected as shown below:

Column 11, Example 54, "CH(CH$_3$)CH$_3$)CH$_2$CH$_2$" should read -- CH(CH$_3$)CH(CH$_3$)CH$_2$CH$_2$ --

Column 11, Example 61, "CH$_2$CH(C$_3$H$_7$)CH$_2$(C$_3$H$_7$)" should read -- CH$_2$CH(C$_3$H$_7$)CH$_2$CH(C$_3$H$_7$) --

Column 11, Example 68, "C(CH$_3$)$_2$C(CH$_3$)C(CH$_3$)$_2$CH$_2$" should read -- C(CH$_3$)$_2$C(CH$_3$)$_2$C(CH$_3$)$_2$CH$_2$ --

Column 11, Example 69, "C(CH$_3$)$_2$C(CH$_3$(CH$_3$)$_2$CHCH$_3$" should read -- C(CH$_3$)$_2$C(CH$_3$)$_2$C(CH$_3$)$_2$CHCH$_3$ --

Column 11, Table III, line 3 of right-hand Column heading "octahydro-benz[o6.7]-" should read --octahydro-benzo[6,7]- --

Column 11, line 58, Example 83, "[1,2,3-di]pyrrolo-" should read -- [1,2,3-de]pyrrolo- --

Column 16, line 44, "The quaternary salt, 1,2,3,4,5,6,10,11,15b-octahydro-" should read -- The quaternary salt, 1,3,4,5,6,10,11,15b-octahydro- --

Column 18, line 74, "pyrido[2,1-b]isoquinoline" should read -- pyrido[2,1-a]isoquinoline --.

Signed and sealed this 19th day of December 1972.

(SEAL)
Attest:

EDWARD M. FLETCHER, JR.
Attesting Officer

ROBERT GOTTSCHALK
Commissioner of Patents